United States Patent
Drewes et al.

(10) Patent No.: US 6,595,064 B2
(45) Date of Patent: Jul. 22, 2003

(54) CAPACITIVE PRESSURE SENSOR

(75) Inventors: Ulfert Drewes, Müllheim (DE); Andreas Rossberg, Bad Säckingen (DE); Frank Hegner, Lörrach (DE); Elke Maria Schmidt, Schopfheim (DE); Jürgen Breme, Heusweiler (DE); Thomas Velten, Wehr (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/863,271

(22) Filed: May 24, 2001

(65) Prior Publication Data

US 2002/0014124 A1 Feb. 7, 2002

Related U.S. Application Data
(60) Provisional application No. 60/264,032, filed on Jan. 26, 2001.

(30) Foreign Application Priority Data

Jul. 26, 2000 (DE) .......................................... 100 36 433

(51) Int. Cl.[7] .................................................. G01L 9/12
(52) U.S. Cl. ............................ 73/718; 73/724; 73/715; 361/283.1
(58) Field of Search .......................... 73/718, 724, 715; 361/283, 283.1, 283.4, 521; 338/2, 5

(56) References Cited

U.S. PATENT DOCUMENTS

| | | | |
|---|---|---|---|
| 4,405,970 A | | 9/1983 | Swindal et al. |
| 4,424,713 A | * | 1/1984 | Kroninger et al. ............. 73/718 |
| 4,490,773 A | * | 12/1984 | Moffatt ..................... 361/283.4 |
| 4,903,532 A | * | 2/1990 | Tamai et al. ................... 73/718 |
| 5,056,369 A | * | 10/1991 | Tamai et al. ................... 73/718 |
| 5,381,299 A | | 1/1995 | Provenzano et al. |
| 5,400,489 A | * | 3/1995 | Hegner et al. ............. 29/25.41 |
| 5,488,869 A | | 2/1996 | Renaud |
| 5,552,015 A | | 9/1996 | Arndt et al. |

FOREIGN PATENT DOCUMENTS

| | | |
|---|---|---|
| DE | 1193271 | 5/1965 |
| DE | 2242288 | 3/1974 |
| DE | 2749907 A1 | 5/1978 |
| DE | 2911349 A1 | 10/1979 |
| DE | 3214031 A1 | 2/1983 |
| DE | 2003593 | 4/1983 |
| DE | 3222620 A1 | 8/1983 |
| DE | 206218 | 1/1984 |
| DE | 3341735 * | 5/1984 |
| DE | 3940709 A1 | 6/1991 |
| DE | 4206677 C1 | 9/1993 |
| DE | 19608321 A1 | 8/1997 |
| EP | 0385574 A1 | 9/1990 |
| EP | 0610806 B1 | 12/1999 |
| GB | 2124770 A | 2/1984 |
| GB | 2124770 | 2/1984 |
| JP | 59148843 A | 8/1984 |

OTHER PUBLICATIONS

Patent Abstracts of Japan, 59148843, Aug. 25, 1884, Matsukawa Hideki, Electrostatic Capacity–Type Pressure Sensor.

Patent Abstract of SU 449266, Differential Monometer Protection Equipment has Shut–Off Setters to Deal with Alternating Changes of Pressure.

* cited by examiner

*Primary Examiner*—Andrew H. Hirschfeld
*Assistant Examiner*—Marissa Ferguson
(74) *Attorney, Agent, or Firm*—Jones, Tullar & Cooper, P.C.

(57) ABSTRACT

A diaphragm 30 and basic body 20 of a pressure sensor 10 are interconnected via a joint F. A groove 26 is provided in the basic body 20 in order to reduce the stress concentration in the region of the joint F.

9 Claims, 3 Drawing Sheets

CAPACITIVE PRESSURE SENSOR

This application was filed as a provisional application on Jan. 26, 2001 as application No. 60/264,032.

FIELD OF THE INVENTION

The invention relates to a capacitive pressure sensor.

BACKGROUND OF THE INVENTION

Such pressure sensors are frequently used in process automation in order to measure the pressure of different process media, which can be present as liquids, gases or vapors.

Such pressure sensors essentially comprise a basic body and a diaphragm, which both preferably consist of a ceramic or a monocrystalline material. Provided on the basic body is a flat cutout which is also called a diaphragm bed and which is completely covered by the diaphragm.

The diaphragm bed and the diaphragm delimit a measuring chamber which is separated from the actual process medium and which is generally filled with air or with a silicon oil as hydraulic medium. The pressure chamber is gas tight or liquid tight. This requires a substantial outlay in the production of the connection between the diaphragm and basic body.

Provided in each case on the diaphragm bed and the underside, facing the diaphragm bed, of the diaphragm are electrodes which are mostly applied using sputtering technology, vapor deposition methods or, for example, the screen printing method, as described in U.S. Pat. No. 5,050,035, for example. These two electrodes together form the actual measuring capacitor whose measuring signal is evaluated.

If a reference pressure PR acts on the diaphragm, and if this pressure differs from the pressure prevailing in the pressure chamber, the diaphragm is deformed elastically. This leads to a change in the spacing of the two electrodes, and thus to a change in capacitance of the measuring capacitor. The capacitance of the measuring capacitor is a measure of the pressure difference. It is detected as a measuring signal with an electronic evaluation system to which two electrodes are connected, and is evaluated.

A distinction is made between pressure sensors for relative pressure, absolute pressure and differential pressure, depending on which reference pressure is present in the pressure chamber or on the outside of the diaphragm.

It is customary to speak only of the pressure which is measured, and not of the pressure difference, as would actually be appropriate.

In addition to simple pressure sensors, so-called differential pressure sensors are also known which detect the difference between two process pressures. Such differential pressure sensors consist, for example, of two such described pressure sensors, with the difference that they have a common basic body. The measuring chambers are located on the opposite sides of the basic body. They are interconnected by a connecting channel which serves the purpose of pressure compensation.

In the case of a further differential pressure sensor, two measuring chambers are separated from one another in a basic body by a common diaphragm.

In both cases, the pressure difference between the process pressures prevailing on the two sides of the basic body is the measured variable of interest.

The diaphragm and basic body are interconnected via a joint. In the case of a ceramic sensor, the joining can be performed by means of active solder or a glass frit. It is possible in the case of a sensor made from monocrystalline material to make use, for example, of eutectic bonding, anodic bonding or fusion bonding as the joining technique.

The diaphragm, basic body and the joint itself are very strongly loaded at the joint by a stress concentration as a consequence of notch stresses when a high pressure prevails in one of the measuring chambers or also in both measuring chambers. In the extreme case, cracks can form in the diaphragm or in the basic body or the connection between the diaphragm and basic body can be torn apart, and this leads to a failure of the pressure sensor.

U.S. Pat. No. 5,520,054 discloses a pressure sensor in the case of which the wall in the region of the joint is widened in order to reduce the loading of the joint. This measure is very complicated in terms of production technology. Moreover, there is a reduction in the stiffness of the regions of the ceramic which border on the joint. As a result, it is only the stress directly at the joint which is reduced. The stress maximum continues nevertheless to be located in the region of the joint.

It is the object of the invention to create a pressure sensor which displaces into the basic body the stress concentrations produced as a consequence of notch stresses at the root of the joint, since the connection between the diaphragm and basic body is mostly weaker than the bulk material of the basic body. A further object of the invention is not only to displace the site of the stress concentration, but to reduce the maximum stresses. It is also to be possible for the pressure sensor to be produced simply and cost effectively.

This object is achieved by means of a pressure sensor having a basic body, a diaphragm connected to the basic body via a joint, a measuring capacitor for generating a measuring signal with a first and second electrode, which are respectively applied opposite one another on the diaphragm and on the basic body, a groove adjoining in the basic body at the end of the root of the joint.

The groove reduces stress concentrations in the region of the joint.

Advantageous developments of the invention are specified in the subclaims.

The following discussion applies to capacitive pressure sensors and capacitive differential pressure sensors correspondingly, and so for the sake of simplicity only capacitive pressure sensors will be treated.

The invention is described in more detail below with the aid of an exemplary embodiment illustrated in the drawing, in which:

FIG. 1 shows a schematic plan view of three capacitive pressure sensors,

FIG. 2 shows an enlarged detail A in accordance with FIG. 1, in accordance with a first exemplary embodiment, FIG. 3 shows an enlarged detail A in accordance with FIG. 1, in accordance with a second exemplary embodiment, FIG. 4 shows an enlarged detail A in accordance with FIG. 1, in accordance with a third exemplary embodiment, and FIG. 5 shows an enlarged detail A in accordance with FIG. 1, in accordance with a fourth exemplary embodiment.

Illustrated in plan view in FIG. 1a is a first capacitive pressure sensor 10 which essentially consists of a cylindrical basic body 20 and a circular diaphragm 30. The diaphragm 30, which covers a pressure chamber 40, is connected to the basic body 20. The connection between the underside 32 of the diaphragm 30 and the basic body 20 is performed along a joint F.

Illustrated in plan view in FIG. 1b is a second capacitive pressure sensor 10, which essentially consists of a cylindrical basic body 20 and a circular diaphragm 30. The diaphragm 30, which covers a pressure chamber 40, is connected to the basic body 20. The underside 32 of the diaphragm 30 and the basic body 20 are permanently interconnected by bonding.

Illustrated in plan view in FIG. 1c is a third capacitive pressure sensor 10, which essentially consists of a cylindrical basic body 20 and a circular diaphragm 30. The diaphragm 30, which covers a diaphragm bed 22 provided on the basic body, is connected to the basic body 20. The connection between the underside 32 of the diaphragm 30 and basic body 20 is performed along a joint F.

The basic body 20 and diaphragm 30 consist of a brittle ceramic or monocrystalline material, for example aluminum-oxide ceramic (FIG. 1a, FIG. 1c) or silicon material (FIG. 1b).

An active hard-soldered joint which is produced in a vacuum at approximately 900° C. is conceivable, for example, in the case of ceramic as a gas tight and liquid tight joint. In the case of silicon, it is possible to select fusion bonding, for example, as the connecting technique. In the connected state, the diaphragm 30 and basic body 20 delimit a pressure chamber 40 which is filled either with air or with a virtually incompressible liquid, for example a silicon oil. Reference pressure PR prevails in the pressure chamber 40 in the unloaded state. Pressure is applied to the pressure chamber 40 via a channel 42.

A first electrode 40a is applied to the underside 32 of the diaphragm. A second electrode 40b is applied to the diaphragm bed 22. The application can be performed, for example, by sputtering, vapor deposition or using screen printing technology. If the diaphragm and basic body consist of a semiconductor material, the semiconductor material can be used directly as an electrode without application of a metal layer. The second electrode 40b essentially covers the concave central surface 60. However, it need not necessarily cover the latter entirely.

The two mutually opposite electrodes 40a, 40b form a measuring capacitor whose capacitance depends on the prevailing process pressure P. The layer thicknesses of the electrodes 40a and 40b are represented in each case in a greatly exaggerated fashion for the purpose of clarity. The electrodes 40a, 40b are connected via connecting lines (not illustrated in more detail) to an electronic evaluation system (likewise not illustrated).

The electronic evaluation system for the measuring signal of the measuring capacitor is prior art. There is therefore no description of the electronic evaluation system, which is not the subject matter of this invention.

FIG. 2 shows an enlarged detail in the region of the joint F in accordance with a first exemplary embodiment. A groove 26 directly adjoins the end of the joint (root of the joint).

The groove 26 is approximately 1 mm wide and 1 mm deep in the exemplary embodiment illustrated.

The joint of the ceramic sensor consists of an active hard-soldered joint 50. The spacing between the diaphragm 30 and basic body 20 is least in the region of the web 24.

This also means that the active hard-soldered joint is extremely thin here.

The diaphragm bed 22 is ground and is only a few micrometers deep. The outer circumferential line of the diaphragm bed 22 is denoted by U. It runs parallel to the diaphragm 30. In the case illustrated, the center line M of the groove 26 is perpendicular to the circumferential line U. The groove illustrated in FIG. 2 can easily be pressed into ceramic, and can therefore be produced virtually at no cost when pressing the ceramic basic body. This shape of the groove can also easily be recessed by means of an etching process into monocrystalline material such as, for example, silicon.

Further preferred exemplary embodiments of the invention are illustrated in FIGS. 3 and 5, and differ from one another only in the respective shape of the groove 26.

The functioning of the invention is explained in more detail below with the aid of a pressure sensor having a diaphragm bed.

Figure 1A:
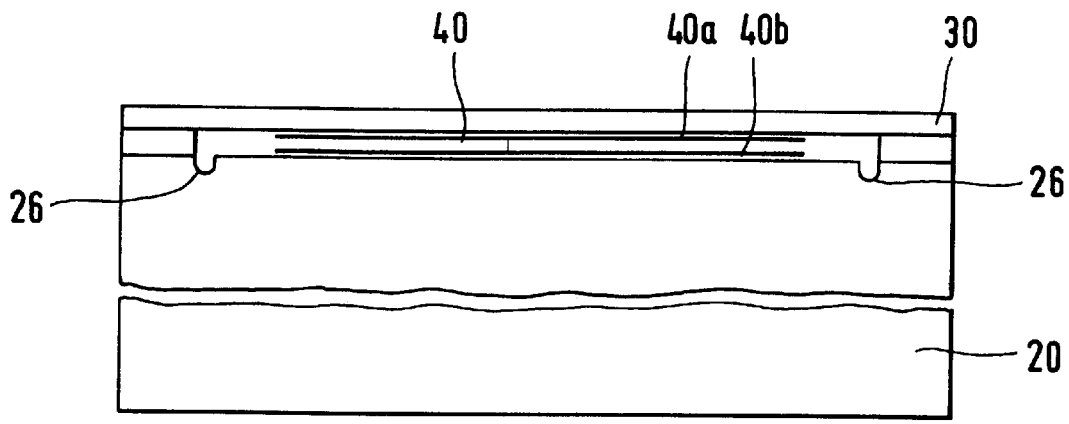
Figure 1B:
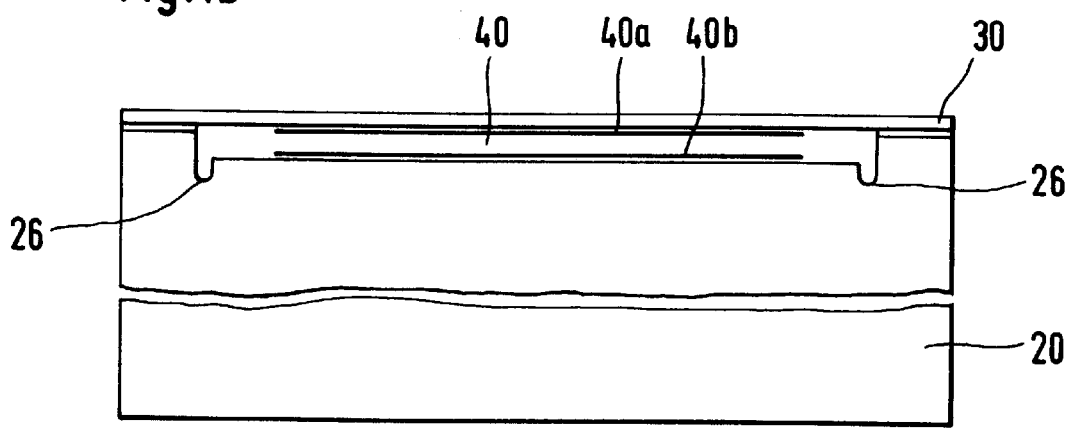
Figure 1C:
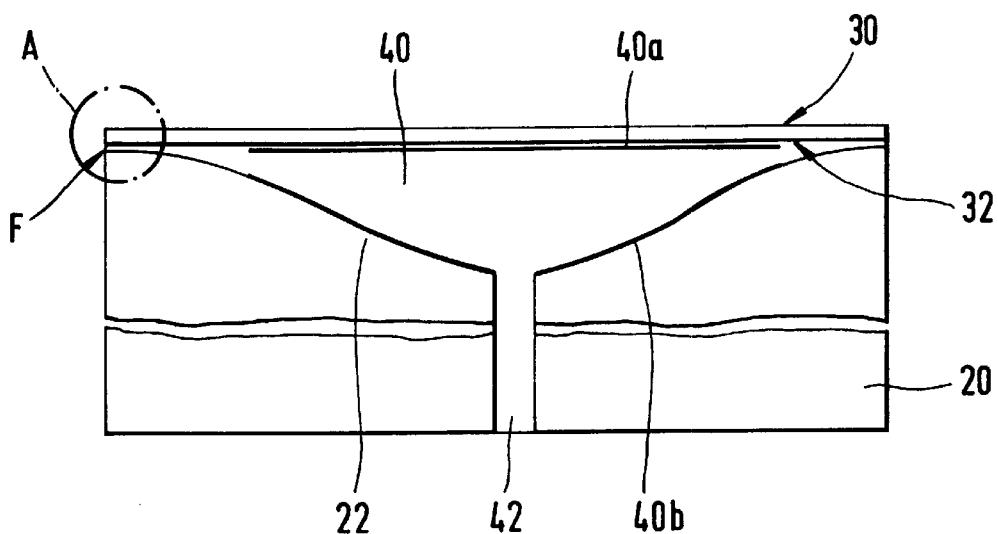
Figure 2:
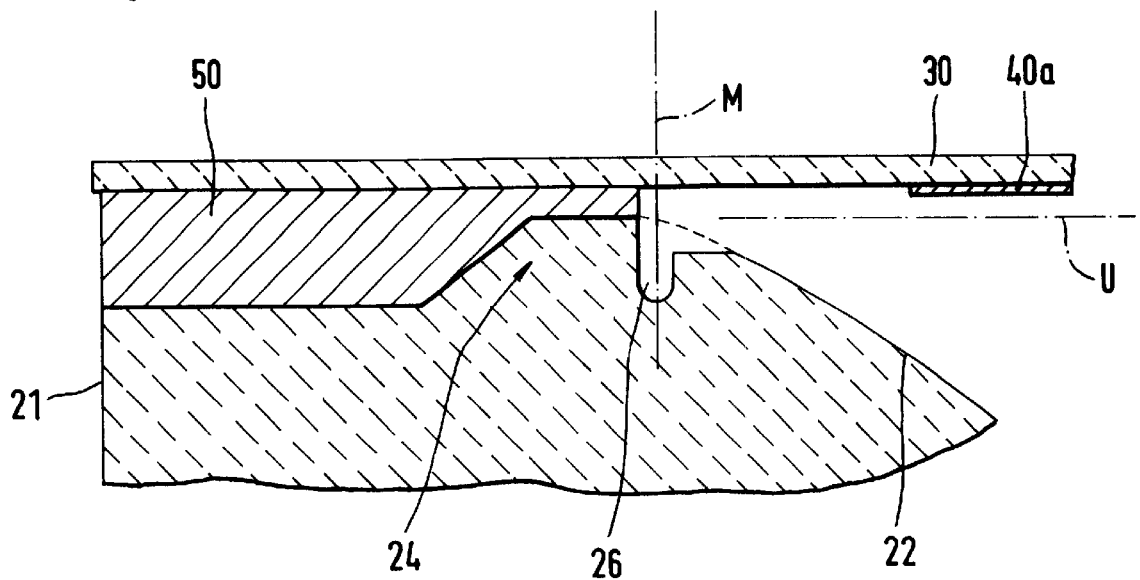
Figure 3:
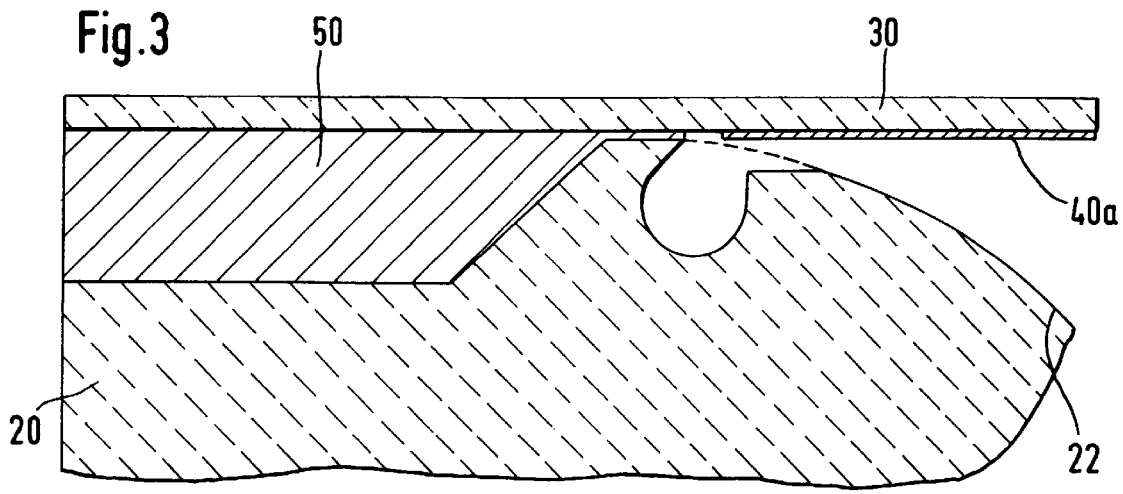
FIG. 3 and FIG. 4 show grooves with a bulging or elongated cross section, which can subsequently be recessed into a pressed ceramic green compact. These grooves are therefore more cost intensive than the grooves shown in FIG. 1, but are a better solution to the task set than the groove of FIG. 2, as simulations using the finite element method show.
Figure 4:
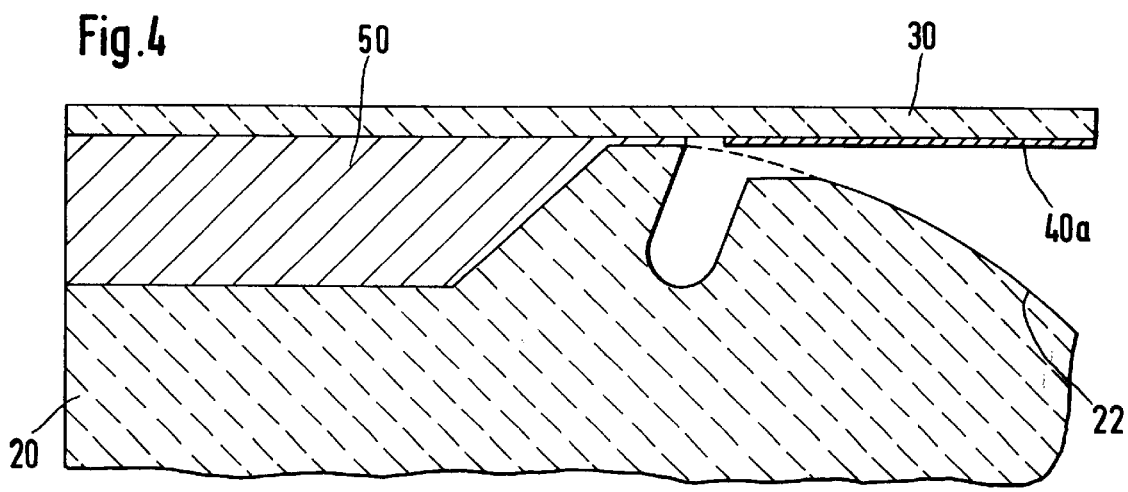
Figure 5:
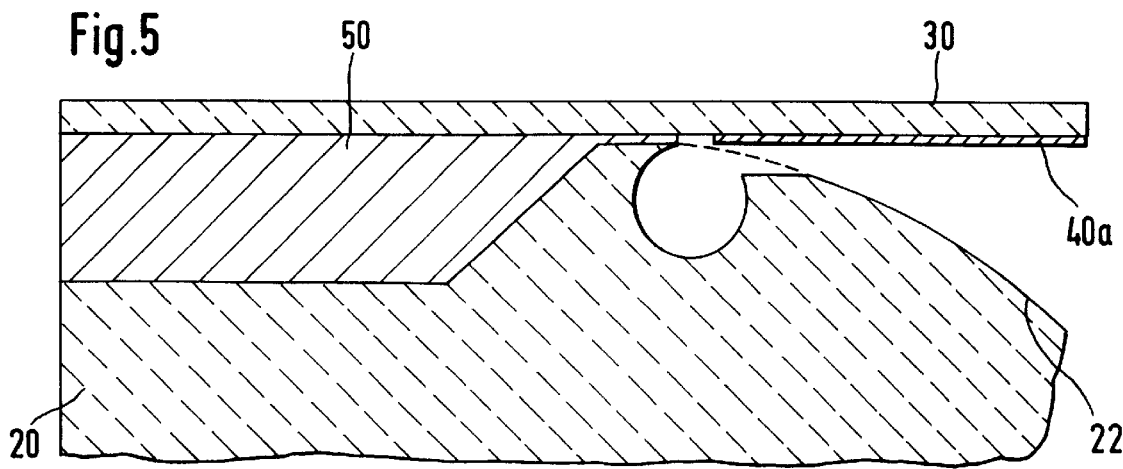
FIG. 5 shows a groove with a circular cross section, which can easily be introduced into a silicon basic body by isotropic etching. According to simulations using the finite element method, the groove shown in FIG. 5 solves the task set more effectively than the groove in FIG. 2.

Pressure is applied via the channel 42 to the fluid located in the pressure chamber 40. As a result, the pressure in the pressure chamber 40 rises. The diaphragm 30 will bulge outwards with rising pressure P. This results in substantial stresses in the basic body, in the diaphragm and in the region of the joint F, preferably at the root of the joint. However, these stresses are led away from the joint by the groove 26 in the direction of the interior of the basic body 20. The joint, which frequently withstands a lesser loading than the basic body, is thereby relieved. Moreover, the grooves represented in FIGS. 2, 3, 4, 5 diminish the stress peaks. That is to say, the stresses are distributed over a larger region.

The pressure P prevailing in the pressure chamber also presses the outer edge of the groove in the direction of the edge 21, as a result of which the diaphragm 30 is somewhat stressed.

This effect can be used effectively in the case of differential pressure sensors, in particular, since with such sensors having two chambers the diaphragm is compressed in the region of the circumferential line U by the pressure prevailing in the pressure chambers, and this leads precisely to a reduction in the stress in the diaphragm 30. These two opposing effects can be selected in strength such that they just compensate one another. In this case, the diaphragm 30 is free of stress at every nominal pressure P. The nominal pressure then no longer influences the sensor sensitivity.

What is claimed is:

1. A pressure sensor, comprising:
   a basic body having a diaphragm bed;
   a diaphragm connected to said diaphragm bed; and
   a measuring capacitor for generating a measuring signal, said measuring capacitor having a first electrode and a second electrode applied opposite one another on said basic body and on the underside of said diaphragm, wherein a groove is formed in said diaphragm bed, at the end of a joint formed by said diaphragm and said basic body, said groove adjoining said measuring capacitor and serving for stress concentration relief.

2. The pressure sensor as defined in claim 1, wherein said grove has a bulging cross section.

3. The pressure sensor as defined in claim 1, wherein said groove has an elongated cross section.

4. The pressure sensor as defined in claim 1, wherein said groove has a circular cross section.

5. The pressure sensor as defined in claim 1, wherein said basic body is made from one of: a ceramic and monocrystalline material.

6. The pressure sensor as defined in claim 2, wherein said basic body is made from one of: a ceramic and monocrystalline material.

7. The pressure sensor as defined in claim 3, wherein said basic body is made from one of: a ceramic and monocrystalline material.

8. The pressure sensor as defined in claim 4, wherein said basic body is made from one of: a ceramic and monocrystalline material.

9. The pressure sensor as defined in claim 1, wherein said groove includes a curved surface.

* * * * *